US005489109A

United States Patent [19]
Murphy

[11] Patent Number: 5,489,109
[45] Date of Patent: Feb. 6, 1996

[54] DOLLY CONVERTER HITCH ASSEMBLY FOR CONVERSION TO UTILITY TRAILER

[76] Inventor: Curtis L. Murphy, 3737 W. Chestnut Expressway, Springfield, Mo. 65802

[21] Appl. No.: 205,783

[22] Filed: Mar. 4, 1994

[51] Int. Cl.⁶ .................................................. B62B 1/20
[52] U.S. Cl. .................. 280/415.1; 280/47.27; 280/471.31; 280/656
[58] Field of Search ............................ 280/415.1, 47.27, 280/47.28, 47.11, 47.17, 47.131, 656, 30, 491.5, 47.315, 47.371, 24, 493

[56] References Cited

U.S. PATENT DOCUMENTS

| | | | |
|---|---|---|---|
| 2,760,789 | 8/1956 | Wampler | 280/491.5 |
| 3,368,827 | 2/1968 | Dashew | 280/656 |
| 3,679,225 | 7/1972 | McKinney | 280/47.18 |
| 3,785,669 | 1/1974 | Doheny | 280/47.18 |
| 3,797,846 | 3/1974 | Pevic | 280/24 |
| 4,227,709 | 10/1980 | Gradwohl et al. | 280/47.11 |
| 4,353,563 | 10/1982 | Foster | 280/493 |
| 4,533,151 | 8/1985 | Maitland | 280/30 |
| 4,570,961 | 3/1986 | Chateauneuf et al. | 280/47.18 |
| 4,921,270 | 5/1990 | Schoberg | 280/655.1 |
| 5,005,844 | 4/1991 | Douglas et al. | 280/1.5 |
| 5,005,846 | 4/1991 | Taylor | 280/30 |
| 5,028,060 | 7/1991 | Martin | 280/39 |
| 5,031,926 | 7/1991 | Wannamaker | 280/47.2 |
| 5,087,061 | 2/1992 | Wallace | 280/30 |

FOREIGN PATENT DOCUMENTS 258650  5/1949  Switzerland .......................... 280/30

*Primary Examiner*—Mitchell J. Hill
*Attorney, Agent, or Firm*—Polster, Lieder, Woodruff & Lucchesi

[57] ABSTRACT

The compactly stowable and convertible hand truck-trailer of this invention comprises a T-shaped converter hitching assembly and a conventional hand truck which includes a carriage frame with legs supported by a pair of wheels at one end and having a transverse handle at the other end. The converter assembly releasably attaches through use of fittings to the legs and handle of the hand truck. The hitching assembly has a hitching adaptor that can be connected to a towing vehicle such as a lawn mower tractor.

13 Claims, 3 Drawing Sheets

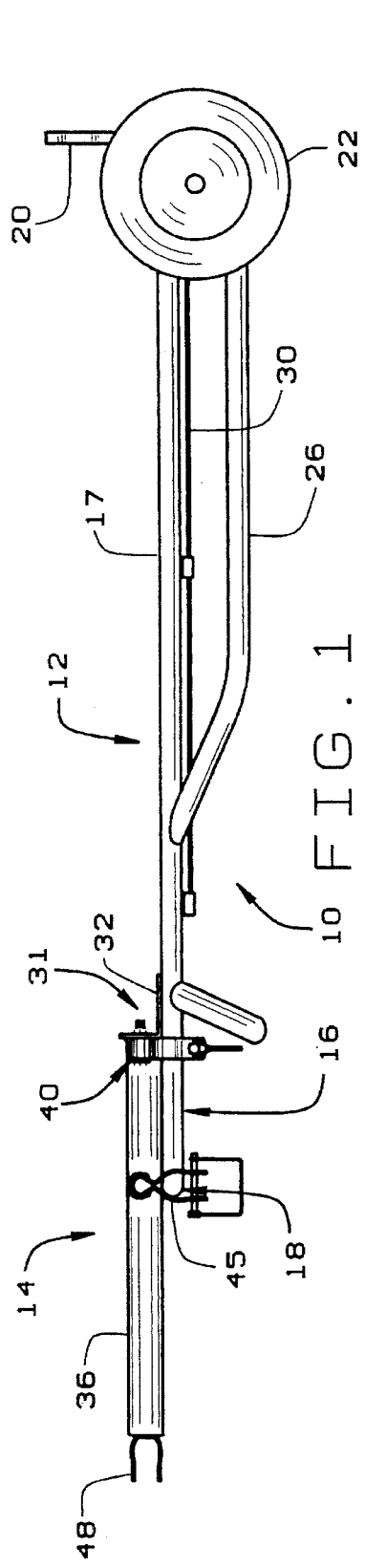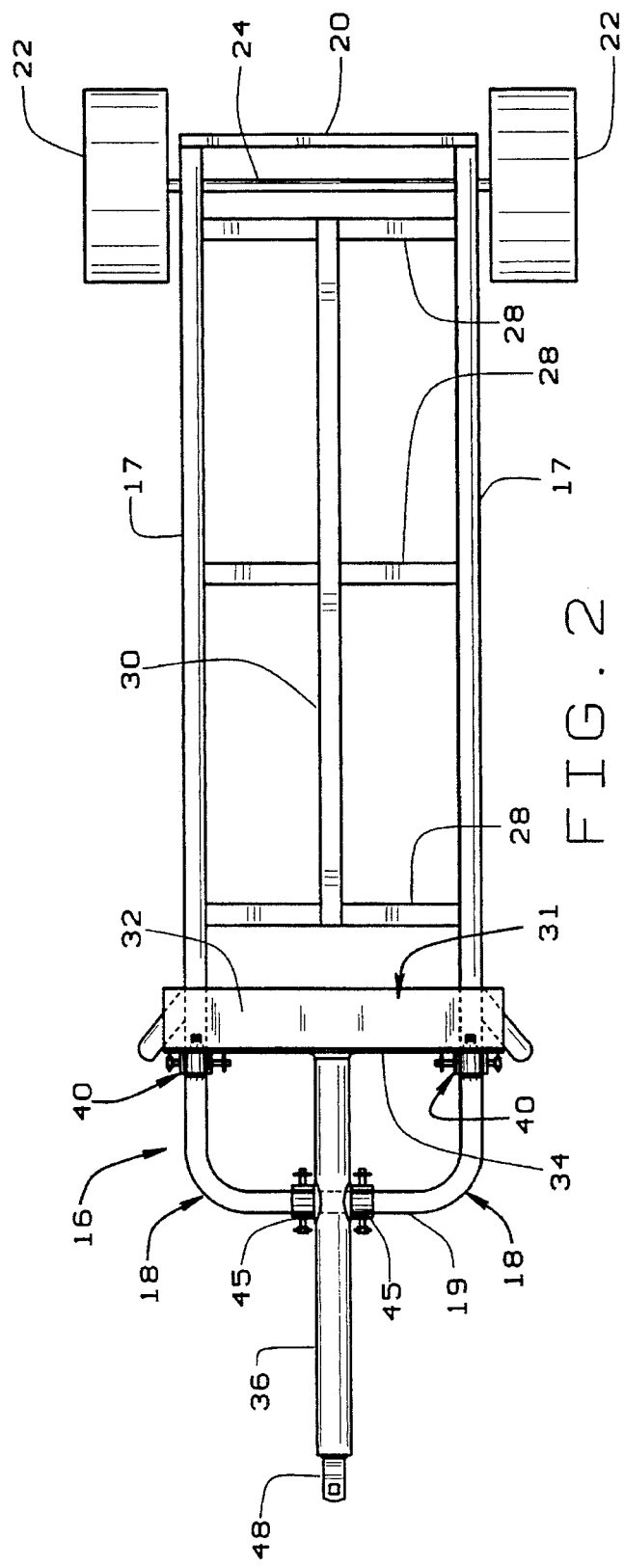

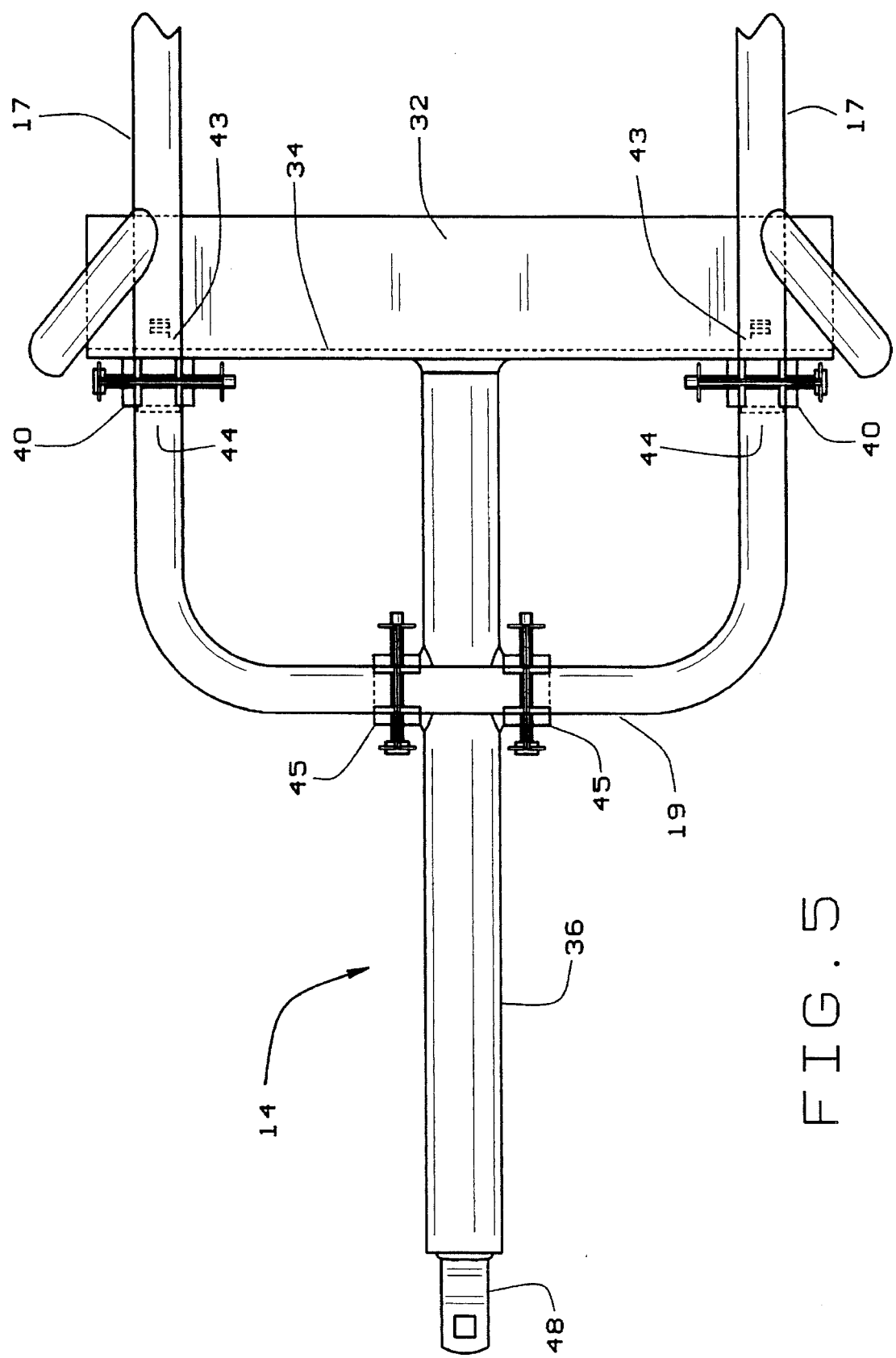

DOLLY CONVERTER HITCH ASSEMBLY FOR CONVERSION TO UTILITY TRAILER

CROSS REFERENCE TO RELATED DISCLOSURE

A Disclosure Document dated Jun. 14, 1993, relating to the present invention was filed with the United States Patent and Trademark Office on Jun. 22, 1993 and recorded as Disclosure Document No. 333644. The content of this Disclosure Document is hereby incorporated by reference.

1. Field of the Invention

This invention relates to a dolly or hand truck converter hitch assembly, and method for its use, for converting a standard dolly into a trailer suitable for towing.

2. Background and Summary of the Invention

The familiar two-wheel hand truck or "dolly" has traditionally found application in a wide array of industrial and other commercial contexts. The standard dolly has further gained acceptance and found application domestically. The dolly or hand truck is useful, domestically, for a variety of projects including the movement of bulky items such as appliances and other household equipment as well as for the routine but awkward task of moving trash receptacles. While considerations relating to maximizing usable space and the storage of equipment are important in industrial and other commercial contexts, such considerations are perhaps more critical in the typical domestic context. For this reason, equipment which can be easily used for more than one purpose and conveniently stored is highly desirable. The present invention satisfies this need by providing a converter which transforms a standard dolly into a readily convertible dolly-trailer suitable for towing behind a vehicle which can be compactly stowed in an upright position either attached to or separated from the dolly-hand truck in a space virtually no greater than that required by the hand truck alone. The invention is adaptable for use such as by being connected to a lawn tractor or other vehicle and used as a hauling trailer. In the past, attempts have been made to expand the traditional scope of utility for hand trucks. For example, in U.S. Pat. No. 4,570,961 to Chateauneuf, et. al., a combination, dolly, wheelbarrow and shovel device is disclosed which relies upon a variety of interchangeable parts and telescoping side members for its versatility. Additionally, U.S. Pat. No. 4,921,270 to Schoberg, U.S. Pat. No. 3,679,225 to McKinney, U.S. Pat. No. 4,227,709 to Gradwohl, et. al. and U.S. Pat. No. 3,785,669 to Doheny each disclose standard two-wheeled hand trucks that convert for use as four-wheel carts in the nature of a wagon. Yet another device is disclosed in U.S. Pat. No. 5,028,060 to Martin which provides for a system of collapsing the handle and undercarriage components of a four-wheeled wagon in order to facilitate the storage and transportability of the wagon. Wheelbarrows have also been the subject of efforts to expand utility as, for example, in U.S. Pat. No. 5,087,061 to Wallace and U.S. Pat. No. 5,031,926 to Wannamaker. Wallace discloses a means for converting a wheelbarrow into a trailer by providing for foldable extension arms and a main frame tow bar that is permanently attached to the axle and undercarriage base rails. And, Wannamaker discloses a caster wheel and tongue assembly that attaches to the U-shaped, parallel frame aspects of a standard wheelbarrow in order to convert it for use as a trailer. Finally, U.S. Pat. No. 5,005,844 to Douglas, et. al. discloses a rolling travois comprising an enlarged roller assembly having a spherically shaped profile. The travois is attached for pulling behind an individual by way of a specially constructed harness worn by the individual.

The structure of each of these carriers, however, is dissimilar to the dolly conversion device of the present invention. Moreover, none of these prior art teachings provides a completely satisfactory conversion of a dolly to a trailer for towing behind a vehicle as disclosed herein.

The present invention comprises several new improvements in the dolly-hand truck art such that conversion from a conventional hand truck to a utility trailer and vice versa can be simply and efficiently accomplished. Significantly, the ease and efficiency with which the present invention can be used substantially eliminates the need for a separate trailer piece of equipment. No permanent modifications or fixtures need to be made or added to the hand truck. The converter hitch assembly is easily assembled from readily available and conveniently attached parts. The manner in which the converter connects to the hand truck makes use of existing structural features of the conventional hand truck and provides for a cooperating mechanical arrangement. Moreover, when the converter is not in use, the hand truck can be used exactly as it is customarily used.

The present hand truck-trailer comprises a conventional hand truck and a releasably attached converter hitch assembly. The conventional hand truck varies in size and configuration but commonly includes an elongate carriage frame forming a transverse or U-shaped handle at one end and terminating at the other end in a toe plate and a pair of wheels. Connecting the handle to the toe plate are longitudinal side members which are fixedly attached to transverse load-supporting cross-members.

The converter hitch assembly renders the dolly-hand truck suitable for towing behind a vehicle such as, for example, a riding lawn mower or forklift. It is generally T-shaped and includes a first member which, for example, can be an angle iron or other suitable member, and a second member, as for example, a pipe or bar with a suitable hitching adaptor at its distal end. The assembly further comprises a means for releasably attaching to the dolly-hand truck. Suitable means for releasable attachment of the first and second members include, for example, a plurality of collar fittings attached to the first and second members which clamp about the frame of the dolly-hand truck and lock thereabout by suitable fasteners. Alternatively, releasable attachment can be by a plurality of pre-bored metal plates attached to the first and second members and secured to the hand truck frame by suitable U-bolts and nuts. Additionally, the releasable attachment means can be by direct attachment of the first and second members to the hand truck by bolts and nuts, and/or a combination of the releasable attachment means herein discussed. Other, additional aspects and advantages of the present invention will become apparent when consideration is given to the balance of the specification contained herein.

BRIEF DESCRIPTION OF THE DRAWINGS

In the accompanying drawings:

FIG. 1 is a side elevational view of the preferred embodiment of the present invention with the unseen side being a mirror image;

FIG. 2 is a top plan view of the preferred embodiment of the present invention;

FIG. 5 is an enlarged bottom plan view of the preferred embodiment of the present invention.

DETAILED DESCRIPTION OF THE PREFERRED EMBODIMENT

Figure 3:
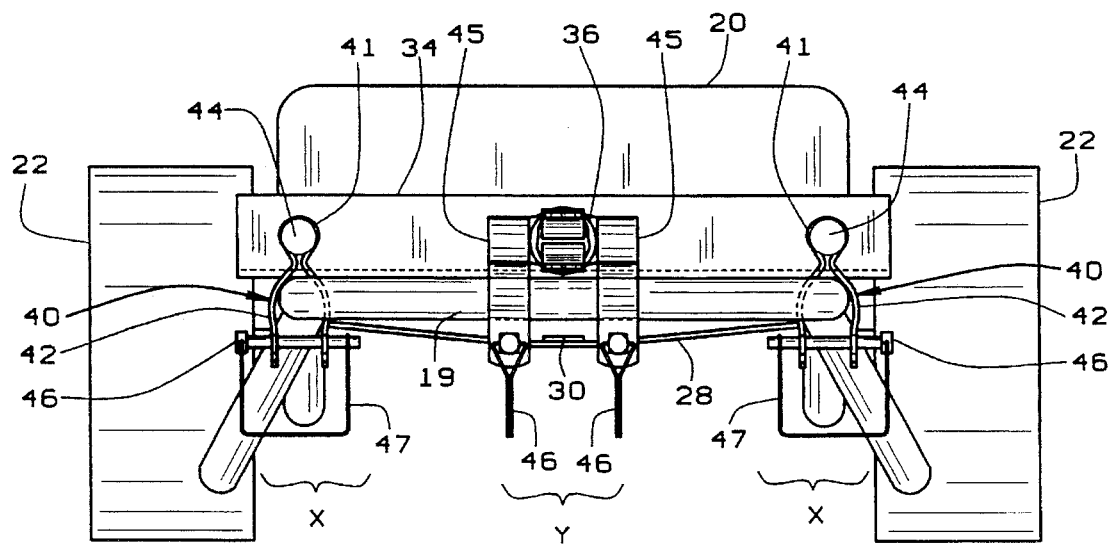
FIG. 3 is an enlarged front elevational view of the preferred embodiment of the present invention showing the collar fittings and locking pin fasteners.

As seen in the drawings, in a preferred embodiment, the convertible hand truck trailer 10 of the present invention includes a conventional hand truck 12 and a releasably attachable hitching converter 14. The hand truck 12 has a structure well known in the art and comprises a U-shaped outer frame member 16 which has a pair of tubular, longitudinal legs 17 that bend at bends 18 into a transverse handle 19. The legs 17 are secured at their lower ends to a toe plate 20. A pair of wheels 22 are mounted to an axle 24 as known in the art. The frame member 16 is reinforced by a pair of tubular frame reinforcers 26, and parallel transverse supports 28 which are secured to a central longitudinal support 30.

The hitching converter 14 is generally T-shaped and includes a first transverse member comprising an angle iron 31. Angle iron 31 has a bottom flange 32 and an upright flange 34. The converter 14 further comprises a longitudinal second member 36 illustrated as a pipe. The proximal end of pipe 36 is secured, as by welding, to the upright flange 34.

Figure 4:
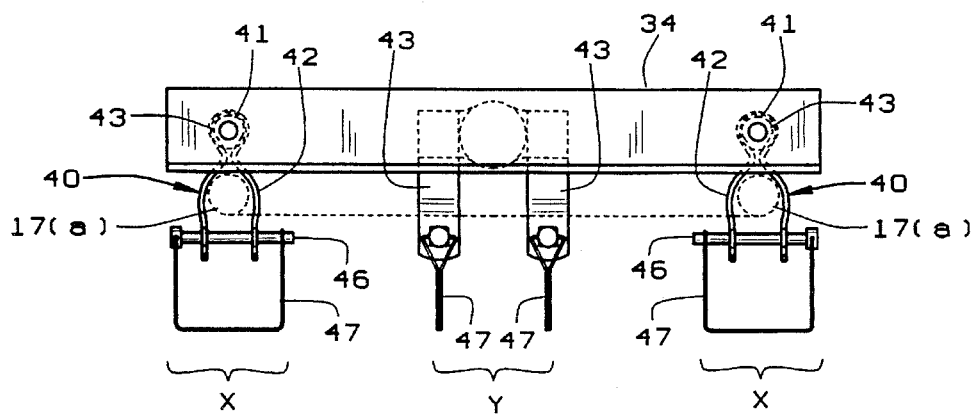
FIG. 4 is an enlarged rear elevational view of the preferred embodiment.

The hitching converter 14 further comprises means for securing the angle iron 31 to the dolly frame legs 17, comprising a first pair of collar fittings 40 positioned near each end of the angle iron 31. Each fitting 40 comprises an upper eyelet 41 and lower U-shaped sides 42 which open downwardly for clamping about the dolly frame legs 17 (shown in phantom as 17(a) in FIG. 4). Each fitting 40 is secured by a nut 43 and a bolt 44 which pass through each eyelet 41 and through a bore in upright angle flange 34. The hitching converter 14 also comprises means for securing the pipe 30 to the transverse handle 19, comprising a second pair of collar fittings 45 identical to fittings 40, which are preferably welded or otherwise fixedly attached, as clearly shown in FIGS. 3 and 5 on either side of pipe 36. The U-shaped sides of fittings 45 depend downwardly to clamp about handle 19 (handle 19 is shown in phantom lines in FIG. 4). The fittings 40 and 45 are held about the legs 17 and handle 19 by pins 46 which pass through bores near the ends of the sides 42 of the fittings, and are secured against disengagement by U-shaped spring latches 47 which have one end that passes through a bore at one end of each pin 46, and another ringed end that can be pulled to fit around the opposite end of pin 46. See in particular the front (X) and side (Y) views in FIGS. 3 and 4.

When the converter 14 is mounted atop the hand truck 12, the underside of the angle iron flange 32 touches the top of legs 17, and the underside of pipe 36 touches the top, central region of handle 19.

A suitable hitching adaptor 48, as shown in FIGS. 1, 2 and 5, is forged into or otherwise fixedly attached to the distal end of pipe 36. The dimensions of both members of the T-shaped converter and related hardware specifications are defined based upon the specific configuration and size of the hand truck intended to be converted. This notwithstanding, the dimensions and specifications of the illustrated embodiment are as follows: the angle iron flange 34 is 2 inches wide, flange 32 is 3 inches wide and both flanges are $3/16$ of an inch thick by 16 inches long; the pipe 36 is, typically, 1.5 inches in diameter and 19 inches long; and the collar fittings 40 and 45 are, typically, 3 inches in length. All of these components are preferably made of metal such as steel.

In the preferred embodiment, the converter 14 is attached to the hand truck 12 by first placing the hand truck 12 in a horizontal position as shown in FIG. 1, and placing the converter 14 on top of the hand truck 12 so that collar fittings 45 align intermediately with handle 19 and collar fittings 40 align with longitudinal frame legs 17. The converter 14 is then moved downward so that each of the fittings 40 and 45 are positioned as shown in the drawings to clamp about the handle 19 and frame legs 17. The pins 46 are then inserted and latched to the legs of the fittings as previously described. The trailer 10 is now ready for attachment by hitching adaptor 48 to a vehicle for towing. No special tools are required for this installation and removal of the device is easily accomplished by simply reversing the installation procedure.

Although FIGS. 1–5 show the preferred embodiment, the hitching converter can have a different structure. A conventional hand truck and generally T-shaped converter can be provided substantially as described above. However, instead of attaching to the hand truck by the collar fittings 40 and 45, a plurality of 2 inch wide by 4 inch long by $3/16$ inch thick metal plates having pre-bored pilot holes drilled therethrough can be welded to the converter at the same locations as collar fittings 40 and 45 and in substitution therefor. This modified converter is similarly attached to the dolly by placing the converter on top of the dolly in a horizontal position with the pipe having the welded metal plates touching the transverse handle and having the metal plates welded to the angle iron upright flange touching the longitudinal legs of the dolly. When so positioned, U-bolts are inserted from the underside of the dolly through aligned pilot holes in each of the metal plates and secured by washers and nuts to the threaded ends of the U-bolts which protrude through the pilot holes in the welded metal plates.

Also, alternatively, the T-shaped converter, as previously described, without collar fittings or welded metal plates, can be provided wherein the converter is mounted directly to the hand truck by way of ½ inch machine bolts which pass through pre-bored pilot holes drilled intermediately through the pipe 36 and the corresponding central region of the handle 19 as well as through the angle iron bottom flange 32 and correspondingly through both of the legs 17.

Thus, the foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a hand truck of the type having a carriage frame, including linear longitudinal side members, and a transverse handle member at one end and a toe plate and pair of wheels at the end opposite the handle, the improvement comprising in combination with the hand truck:

an attachable hitching converter comprising:
   a first transverse member having opposing ends, for being releasably secured to said longitudinal side members; and a second longitudinal member connected to said transverse member, for being releasably secured to said handle.

2. The improved hand truck converter assembly of claim 1, further comprising means for securing the converter to the hand truck.

3. The improved hand truck converter assembly of claim 1, further comprising means for releasably securing the transverse member to the hand truck, and means for releasably securing the longitudinal member to the hand truck.

4. The improved hand truck converter assembly of claim 2, wherein the means for releasably securing the transverse member comprises a connector for fitting about one of the longitudinal side members of the hand truck carriage frame.

5. The improved hand truck converter assembly of claim 2, wherein the means for securing one of the longitudinal side members comprises a connector for firing about the handle of the hand truck.

6. The improved hand truck converter assembly of claim 1 further comprising means for hitching the second longitudinal member to a towing vehicle.

7. The improved hand truck converter assembly of claim 1, wherein the first transverse member is an angle iron and the second longitudinal member is a pipe.

8. The improved hand truck converter assembly of claim 7 wherein the dimensions of the angle iron are approximately 2 inches high by 3 inches wide by 3/16 of an inch thick by 16 inches long and the pipe is approximately 1.5 inches in diameter by 19 inches long.

9. The improved hand truck converter assembly of claim 3 wherein the means for releasably securing the transverse member and longitudinal member comprise U-shaped collar fittings and pins and spring latches.

10. The improved hand truck converter assembly of claim 9, wherein the longitudinal member of the hitching converter has sides, and wherein the collar fittings are disposed intermediately and in parallel relation about the sides of the longitudinal member and near the opposing ends of the first transverse member.

11. A convertible hand truck-trailer comprising:
    a. a hand truck of the type having a carriage frame including:
        (1) linear longitudinal side members reinforced by attached lateral supports and a central longitudinal support,
        (2) a toe plate and pair of wheels at one end, and
        (3) a handle at the other end, and
    b. a releasably attachable T-shaped hitching converter comprising:
        (1) a first transverse member having opposing ends,
        (2) a second longitudinal member having a proximal end which is fixedly attached medially to the transverse member, and a distal end having a suitable hitching adaptor fixedly attached thereto, and
    c. a plurality of lockable fasteners for clampingly attaching the converter to the longitudinal side members and the handle of the carriage frame.

12. The hand truck-trailer of claim 11 wherein the transverse member is an angle iron having a bottom and an upright wall with an inner side and outer side, and the longitudinal member is a pipe, and wherein the lockable fasteners are U-shaped collar fittings and pin and spring latches disposed intermediately and in parallel relation about the sides of the pipe and near each end of the outer upright wall of the angle iron.

13. In a hand truck of the type having a carriage frame, including linear longitudinal side members, and a transverse handle member at one end and a toe plate and a pair of wheels at the end opposite the handle, the improvement comprising in combination with the hand truck:
    an attachable hitching converter comprising:
        (a) a first transverse member having a midsection and opposing ends;
        (b) a second longitudinal member having a proximal end and a distal end, the proximal end being secured to the midsection of the transverse member, and the distal end having secured thereto a hitching adaptor;
        (c) means for releasably securing the transverse member to the longitudinal side members of the hand truck carriage frame, comprising connectors which fit about the longitudinal frame side members and are releasably secured thereto by a pin and spring arrangement; and
        (d) means for releasably securing the longitudinal member to the handle of the hand truck comprising a connector that fits about the handle and is releasably secured thereto by a pin and spring arrangement.

* * * * *

UNITED STATES PATENT AND TRADEMARK OFFICE
CERTIFICATE OF CORRECTION

PATENT NO. : 5,489,109
DATED : Feb. 6, 1996
INVENTOR(S) : Curtis L. Murphy

It is certified that error appears in the above-indentified patent and that said Letters Patent is hereby corrected as shown below:

Column 5, Claim 5, line 17 (the third line of Claim 5), the word "firing" is changed to "fitting", so that line 17 reads "side members comprises a connector for fitting about the".

Signed and Sealed this

Fourteenth Day of May, 1996

Attest:

BRUCE LEHMAN

Attesting Officer

Commissioner of Patents and Trademarks